March 30, 1943.  G. W. BATCHELL  2,315,148
LEHR CONVEYER
Filed April 15, 1941  2 Sheets-Sheet 1

Inventor
George W. Batchell
By
Attorney

March 30, 1943. G. W. BATCHELL 2,315,148
LEHR CONVEYER
Filed April 15, 1941 2 Sheets-Sheet 2

Inventor
George W. Batchell
By [signature]
Attorney

Patented Mar. 30, 1943

2,315,148

UNITED STATES PATENT OFFICE 2,315,148

LEHR CONVEYER

George W. Batchell, Toledo, Ohio

Application April 15, 1941, Serial No. 388,651

3 Claims. (Cl. 49—47)

My invention has for its object to provide an efficient conveyer for conveying material through lehrs. The invention, particularly, provides closely positioned belt-supporting rollers rotatably supported on individual bearing rollers and maintained in spaced relation to each other by intermediate, juxtaposed, relatively large bearing rollers having axes substantially in the plane of the axes of the belt-supporting rollers to prevent displacement of the belt-supporting rollers in the direction of the movement of the belt. The belt-supporting rollers may, thus, be freely rotated and produce a substantially plane, flat, or smooth belt surface for heat-treating materials of different kinds.

The invention is of particular advantage when used in the heat-treatment of glassware, and to illustrate a practical application of the invention, I have selected a lehr conveyer as an example of the various structures embodying the invention, which is shown in the accompanying drawings.

Figure 1:
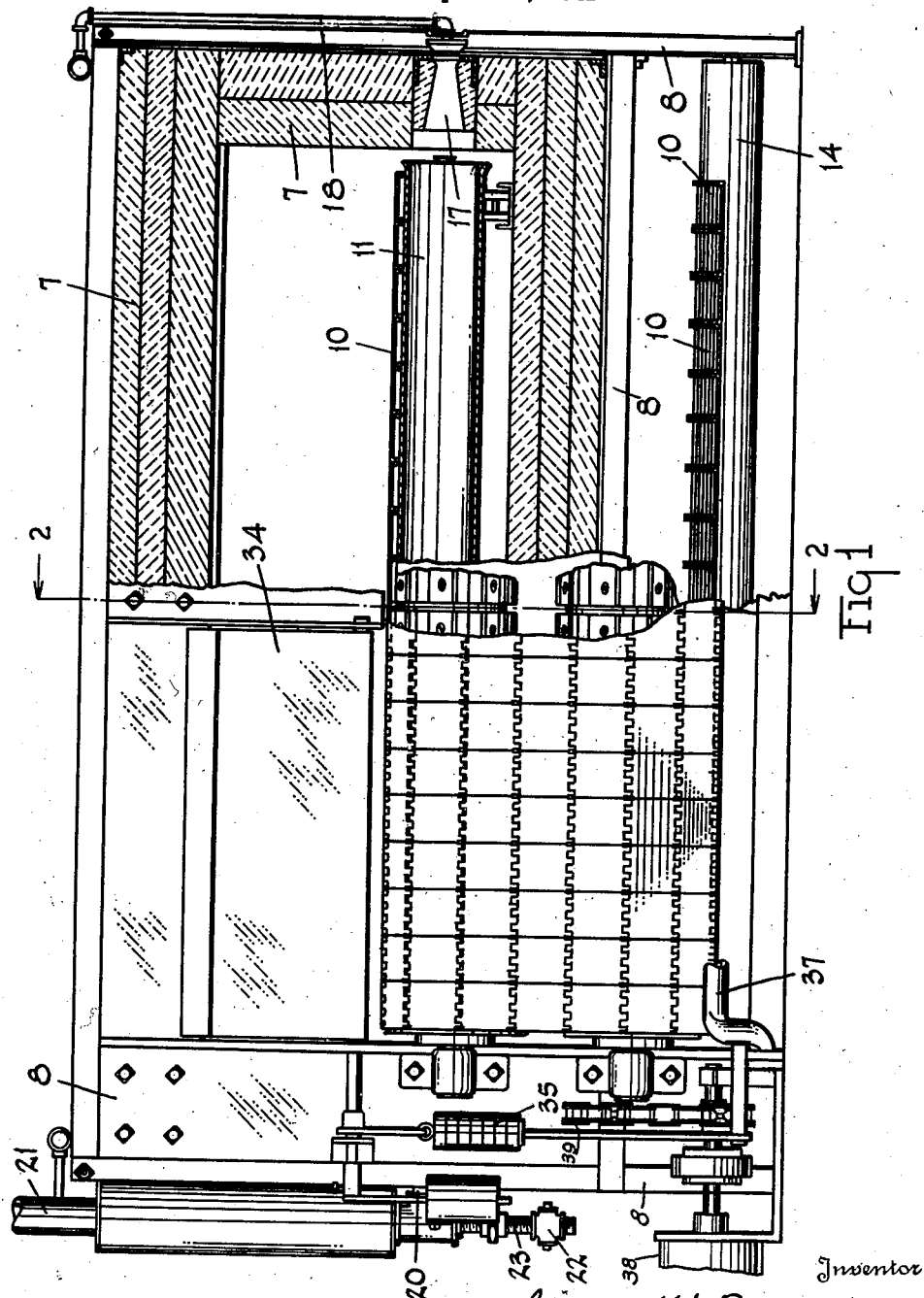
Figures 2, 3:
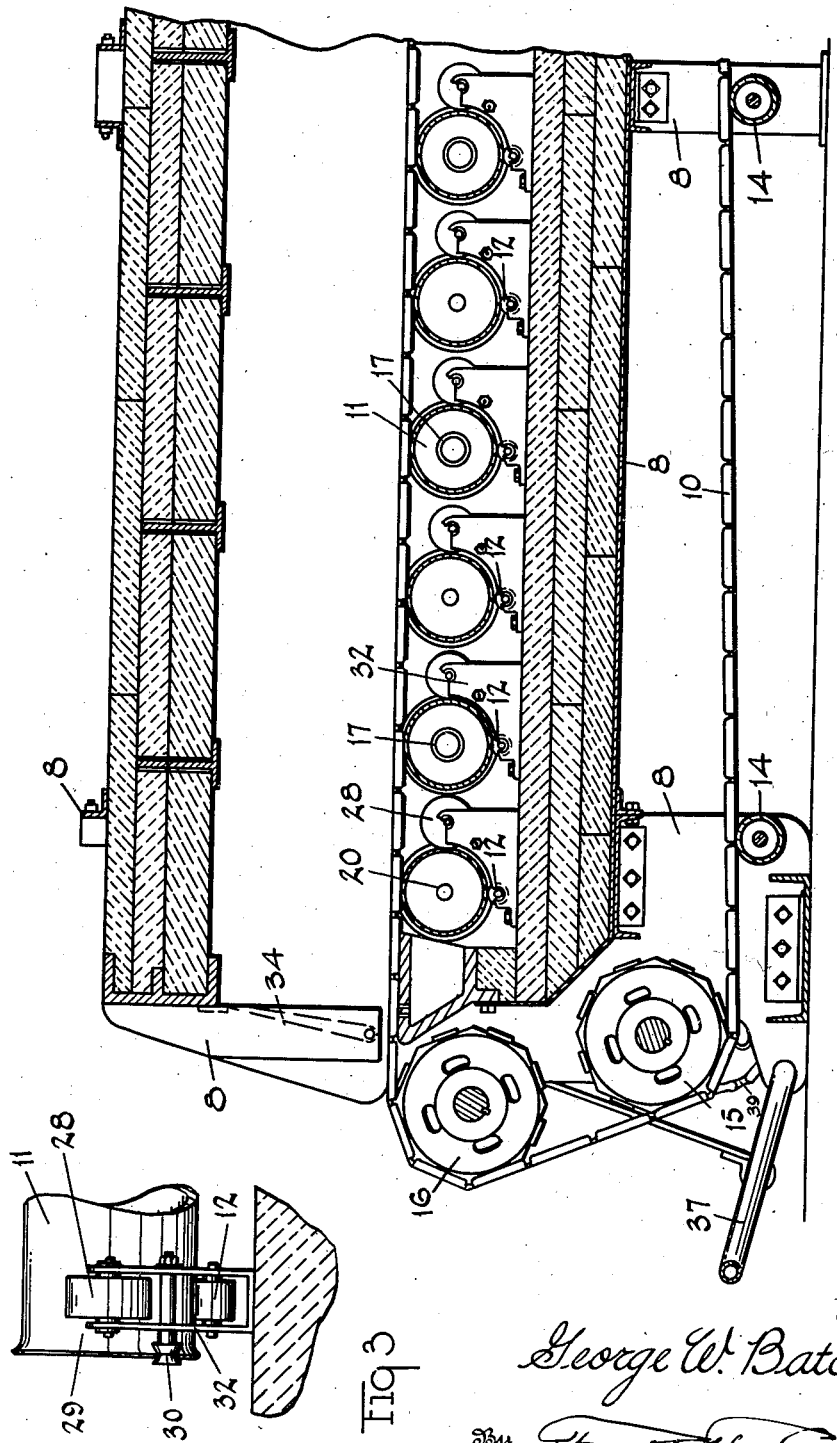

Fig. 1 of the drawings illustrates a front view of a forward end part and a transverse sectional view of part of the forward end of the lehr. Fig. 2 illustrates a longitudinal section of the forward end part of the lehr. Fig. 3 is a side view of the end part of one of the hollow rollers.

As shown in the drawings, the lehr is provided with walls 7, consisting of heat-insulating and refractory bricks or blocks, of the form commonly used in lehr structures, bonded together and supported by a frame 8. A paneled belt 10 is supported within the lehr on a plurality of hollow belt-supporting rollers 11. Each of the ends of the rollers 11 is located on a small bearing roller 12. The axes of the rollers 12 are located substantially in the vertical planes of the axes of the rollers 11 and, thus, provide for the free rotation of the rollers 11. The return portion of the belt is located exterior to the lehr and is supported on the rollers 14 that are pivotally supported on the legs of the frame 8 and are spaced so as to prevent the paneled belt 10 from sagging to an unusual degree. A driving cylinder may be located at the rear end of the lehr, and following cylinders, or idlers, 15 and 16 are located at the forward end of the lehr, by which the belt, when driven, may be slightly tensioned.

The heating zone of the lehr is heated by suitable burners 17 that are located on opposite sides of the lehr and project flames into the alternate ends of the rollers 11 that are located contiguous to each side and, thus, produce a desired spread of the heat within the zones of the lehr. Fuel gas is directed to the burners, by means of pipes 18. Also, a pipe 20 extends into each of the rollers in the direction of their axes and toward the burners, and the products of combustion are withdrawn from each of the rollers, through the pipes 20 and a pipe 21 that may be connected to a stack or a suitable fan, to remove controlled amounts of the products of combustion of the burners from the rollers. The exhaust pressure or suction may be controlled by a valve 22 located in an air inlet pipe 23. The draft from each roller is modified, according to the quantity of air intake through the pipe 23. The temperatures of the different zones of the lehr is regulated by varying the fuel supply to the burners 17 and the effective exhaust draft of the pipe 21 by the operation of the valve 22 that produces a desired movement of the heated gases within the parts of the lehr.

The rollers 11 are retained in their balanced relation on the rollers 12 by relatively large guide rollers 28 located at the sides of each of the ends of the rollers 11. The axes of the guide rollers 28 are, preferably, located substantially in the plane of the axes of the belt-supporting rollers 11. The rollers 12 and 28 are supported by suitable brackets or trunnions 32, disposed along the bottom of the lehr. The guide rollers 28 are located on the trunnions 32 in position to contact the rollers 11 at their sides, at points located, preferably, in substantially diametric relation with respect to the axes of the rollers 28, while the axes of the rollers 12 are located in vertical planes extending substantially through the axes of the rollers 11 and beneath the rollers 11. As the belt 10 is drawn over the rollers 11, the rollers 11 normally contact the leading guide rollers 28 and, thus, freely rotate on the rollers 12. The relatively lateral movement is very slight, and the rollers 11 are maintained, by the guide rollers, in alignment with the burners 17 and the pipes 20, through which fuel gas is introduced into the rollers 11 and exhaust gases, produced by the burners 17, are drawn from the rollers 11.

If desired, the end edges of the belt supporting rollers 11 may be flared as at 29 and grooved rollers 30 may be also rotatably supported on the trunnions 32 to engage the flared edges of the ends of the rollers 11 to limit endwise movement of the rollers 11. The shafts or spindles of the rollers 30 may be located intermediate the bearing rollers 12 and the guide rollers 28, substantially as shown in Fig. 3.

The forward end of the lehr may be opened and closed to enable loading of the paneled belt with glass articles, by means of one or more doors 34, which may be operated by a counter-balancing weight 35 and a suitable pedal 37.

The belt driving roller 15 may be driven by a suitable motor 38 that is connected by suitable sprocket gear and chain 39.

Details of the lehr and the lehr conveyer are shown and described in application Ser. No. 319,326 filed February 16, 1940, Patent #2,243,145 issued May 27, 1941, of which this application is a continuation in part.

I claim:

1. In an article belt conveyer, a plurality of hollow rollers; a plurality of bearing rollers; each end of the hollow rollers supported on a bearing roller, the axes of the bearing rollers located substantially in the vertical planes of the axes of the hollow rollers; a plurality of guide rollers, each guide roller located between each pair of ends of the consecutive hollow rollers; a belt located on the hollow rollers; means for moving the belt on the hollow rollers; and means for rotatably supporting the bearing and guide rollers.

2. In a belt conveyer for heat treating article, a plurality of hollow rollers; a plurality of bearing rollers; each end of the hollow rollers supported on a bearing roller, the axes of the bearing rollers located substantially in the vertical planes of the axes of the hollow rollers; a plurality of guide rollers, each guide roller located between each pair of ends of the consecutive hollow rollers and the axes of the guide rollers located substantially in the horizontal plane of the axes of the hollow rollers; a belt located on the hollow rollers; means for moving the belt over the hollow rollers; and means for rotatably supporting the bearing and guide rollers.

3. In a belt conveyer for heat treating glass article, a plurality of hollow rollers; burners and fuel exhaust pipes located at the ends of the hollow rollers; a plurality of bearing rollers; each end of the hollow rollers supported on a bearing roller, the axes of the bearing rollers located substantially in the vertical planes of the axes of the hollow rollers; a plurality of guide rollers, each guide roller located between each pair of ends of the consecutive hollow rollers; the said bearing and guide rollers operative to maintain the hollow rollers in axial alignment with the burners and the fuel exhaust pipes; a belt located on the hollow rollers; means for moving the belt over the hollow rollers; and means for rotatably supporting the bearing and guide rollers.

GEORGE W. BATCHELL.